United States Patent Office 3,388,187
Patented June 11, 1968

3,388,187
DERIVATIVES OF CARBOXYLIC ACIDS
AND THEIR USES
James Christopher Phillips Sly and David Pedrick Hansell, Tonbridge, and William Flavell, Chessington, England, assignors to Bridge Chemicals Limited, Mundells, Welwyn Garden City, England, a British company
No Drawing. Filed July 12, 1965, Ser. No. 471,414
8 Claims. (Cl. 260—872)

ABSTRACT OF THE DISCLOSURE

The synthesis of various esters of all cis 1,2,3,4-cyclopentanetetracarboxylic acid (CPTCA) having at least one unsaturated aliphatic ester moiety is accomplished by direct esterification or by use of anhydrides. The allyl esters are preferred. The unsaturated esters of CPTCA have utility as cross-linking plasticizers, cross-linking agents in dough moulding plastics and especially as bonding agents; for example, to assist bonding polyvinyl chloride to metal.

---

This invention relates to novel derivatives of cyclopentanetetracarboxylic acid and to the industrial uses of these compounds.

Although 1,2,3,4 - cyclopentanetetracarboxylic acid (hereinafter referred to as CPTCA for the sake of brevity) has six possible geometric configurations which may be referred to as the cccc (or all cis), ctcc, cttc, cctt, tccc and ctct forms (where c represents cis and t represents trans), the present invention is concerned only with derivatives of the all cis form.

The derivatives of all cis CPTCA with which the invention is concerned are the compounds represented by the general formula:

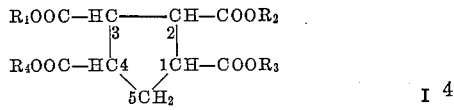

wherein $R_1$, $R_2$, $R_3$ and $R_4$ represent hydrogen, a saturated aliphatic group, for example 2-ethylhexyl or n-butyl, an unsaturated aliphatic group having 3 or more carbon atoms, for example allyl, an alicyclic group, for example cyclohexyl, an aralkyl group, for example 2-phenylethyl, a heterocyclic substituted alkyl group, for example tetrahydrofurfuryl, each of said aliphatic, alicyclic, aralkyl and heterocyclic substituted alkyl groups having up to a maximum of 12 carbon atoms, or a metal cation, the values of $R_1$, $R_2$, $R_3$ and $R_4$ being chosen so that at least one of them is an unsaturated aliphatic group having 3 or more carbon atoms.

Within the class of compounds defined by Formula I there is a preferred class of compounds in which two of $R_1$, $R_2$, $R_3$ and $R_4$ are unsaturated aliphatic groups having 3 or more carbon atoms, especially allyl, and the other two are hydrogen or unsaturated aliphatic groups having 3 or more carbon atoms, especially allyl.

Especially preferred compounds within this class are the diallyl ester of all cis CPTCA and the tetra-allyl ester of all cis CPTCA.

The compounds of Formula I may be prepared by various methods.

In the case of the tetra-esters, these may be prepared by reacting CPTCA or its dianhydride (both of which are known compounds) with the appropriate alcohol, advantageously in an inert solvent for example benzene or toluene, or in an excess of the alcohol, in the presence of a suitable esterification catalyst, for example sulphuric acid. Alternatively, the tetra-ester may be prepared from the appropriate di-ester by reacting it with the appropriate alcohol, preferably in an inert solvent, for example benzene or toluene, in the presence of a suitable esterification catalyst, for example sulphuric acid.

In the case of the di-esters, these may be prepared by reacting CPTCA dianhydride (which can be abbreviated to CPTCADA) with the appropriate alcohol or with an appropriate alkali-metal alkoxide, for example sodium methoxide or sodium butoxide, advantageously using excess alcohol as the reaction medium.

The mono-esters may be prepared by converting the known CPTCA monoanhydride (which can be abbreviated to CPTCAMA) into the desired mono-ester by treating with allyl alcohol.

The tri-esters may be prepared by reacting a di-ester of CPTCAMA with the appropriate alcohol. The di-esters of CPTCAMA, which apart from the 3,4-dimethyl ester are novel compounds, may themselves be prepared by reacting a di-ester of CPTCA with a lower aliphatic carboxylic acid anhydride such as acetic anhydride, preferably in the presence of an inert solvent, for example benzene.

The mixed salt-esters may be prepared by various methods. Thus the disalt-diesters may be prepared by treating CPTCADA with an alkoxide of the appropriate metal, or by double decomposition of a disalt-diester with a solution of a salt of the appropriate metal, for example the disodium salt can be converted into the corresponding calcium salt with a solution of calcium chloride. The other mixed salt-esters may be prepared by analogous methods. Examples of metals which the groups $R_1$, $R_2$, $R_3$ and $R_4$ may represent in Formula I are sodium, calcium, barium and cobalt.

The following examples illustrate the preparation of derivatives of CPTCA in accordance with the invention.

Example 1

All cis CPTCADA (25.0 g.) and allyl alcohol (100 ml.) were stirred and boiled under reflux for 20 minutes and then cooled to 22° C. Toluene (175 ml.) and concentrated sulphuric acid (0.625 ml.) were then added and the mixture stirred and boiled under reflux using a Dean & Stark light entrainer tube for 25½ hours. The reaction mixture was cooled to room temperature, washed with water (1×50 ml.), a saturated sodium bicarbonate solution (50 ml.) and then water (50 ml.). The organic solution was treated with carbon (3 g.) and the solvents removed in vacuo to give 48.0 g. (99.2% theory) of the tetra-allyl ester of all cis CPTCA as a mobile liquid.

Example 2

Di-allyl ester of all cis CPTAC (30 g.), allyl alcohol (90 ml.), toluene (175 ml.) and concentrated sulphuric acid (0.625 ml.) were mixed in a flask fitted with a Dean & Stark light entrainer tube and the mixture refluxed for 25 hours. After cooling to room temperature the residual solution was washed with water (1×50 ml.), a saturated solution of sodium bicarbonate (1×50 ml.) and then water (1×50 ml.). The solution was then treated with carbon (3 g.) and the solvent and excess allyl alcohol removed in vacuo to give 48.0 g. (99.2% theory) of the tetra-allyl ester of all cis CPTCA.

Example 3

All cis CPTCADA (30 g.) and allyl alcohol (60 ml.) were stirred and heated under reflux for 30 minutes and then allowed to cool to 30° C. over 1 hour. Then excess allyl alcohol was stripped under vacuum, maintaining the temperature at 35° C. The mixture was cooled to room temperature, ethyl acetate (40 ml.) added followed by concentrated hydrochloric acid (3 ml.) and water (18 ml.). The organic phase was separated, washed with saturated solution of sodium bicarbonate (20 ml.) to a pH of 4.65, treated with carbon (3 g.) and dried over anhydrous sodium sulphate. Ethyl acetate was then removed in vacuo to give 30.5 g. (65% theory) of the di-allyl ester of all cis CPTCA as a viscous liquid.

Example 4

Small pieces of sodium (total 5.5 g.) were added to allyl alcohol (170 ml.) with stirring at 100° C. during 1 hour. The resulting mixture was then cooled to 15° C. and all cis CPTCADA (25.0 g.) was added portionwise with continuous stirring during 1 hour. The reaction was exothermic and the temperature rose to 50° C. during 2 hours. Water (100 ml.) was then added and the allyl alcohol/water azeotrope removed in vacuo. The residue was dissolved in water (100 ml.), washed with benzene (2×50 ml.), acidified to a pH of 2–3 with concentrated hydrochloric acid (19 ml.) and extracted with ethyl acetate (2×100 ml.). The organic extract was treated with carbon, dried over anhydrous sodium sulphate and the solvent removed in vacuo to give 25.5 g. (66%) of the diallyl ester of all cis CPTCA as a viscous liquid.

Example 5

All cis CPTCAMA (4.56 g.) and allyl alcohol (45.6 ml.) were stirred at 50° C. for 6½ hours. The excess allyl alcohol was then removed in vacuo to give 5.7 g. (100% theory) of mono-allyl ester of all cis CPTCA as a very viscous liquid.

Example 6

Di-allyl ester of all cis CPTCA (32.6 g.), benzene (163 ml.) and acetic anhydride (51 g.) were stirred and boiled under reflux for 3 hours. The benzene and excess acetic anhydride were stripped in vacuo to give 30.8 g. (100% theory) of the di-allyl ester of all cis CPTCAMA as a viscous liquid.

Di-allyl ester of all cis CPTCAMA (30.8 g.) and allyl alcohol (200 ml.) were stirred and boiled under reflux for 13 hours. The excess allyl alcohol was removed in vacuo at 50° C. to give 3.6 g. (100% theory) of triallyl ester of all cis CPTCA.

Example 7

Di-n-butyl ester of all cis CPTCA (17.8 g.), benzene (89 ml.) and acetic anhydride (25.5 g.) were stirred and boiled under reflux for 2½ hours. The benzene and excess acetic anhydride were removed under vacuum at 35° C. to give 17.0 g. (100% theory) of di-n-butyl ester of all cis CPTCAMA as a viscous liquid.

Example 8

Di-(2-ethylhexyl) ester of all cis CPTCA (23.5 g.), benzene (177.5 ml.) and acetic anhydride (28.5 g.) were stirred and boiled under reflux for 8 hours. Then benzene and excess acetic anhydride were stripped under vacuum at 35° C. to give 22.5 g. (100% theory) of a light brown mobile liquid which has di-(2-ethylhexyl) ester of all cis CPTCAMA.

The CPTCA derivatives of the invention have various industrial uses, such as in the plastics and high polymer industries. For example esters of Formula I are useful as cross-linking plasticisers for polyvinyl chloride (P.V.C.), as cross-linking agents in dough moulding and laminating compositions containing polyester resins such as the unsaturated resins used in the glass-fibre reinforced plastics industry, and as bonding agents for assisting the adhesion of polyvinyl chloride to metal surfaces.

Thus in accordance with another aspect of the invention there is provided a method of producing cross-linked plasticised polyvinyl chloride wherein an unsaturated ester of Formula I, preferably a tetra- or di-ester, is employed as cross-linking plasticiser, either alone or in conjunction with a conventional plasticiser such as di-2-ethylhexyl phthalate or di-allyl phthalate.

The unsaturated ester will preferably have two or more unsaturated aliphatic groups. The preferred ester is the tetra-allyl ester of CPTCA.

It has surprisingly been found that plasticised polyvinyl chloride compositions in which the tetra-allyl ester of CPTCA has been used as a cross-linking plasticiser possess low permeability to highly aromatic petroleum fuels and are therefore useful in the manufacture of, for example, gaskets, seals and fuel pipes.

The following example illustrates the use of the esters of the invention in accordance with this aspect of the invention.

Example A

The P.V.C. compositions were prepared from the following constituents:

| Constituent | Parts by weight | | |
|---|---|---|---|
| | A | B | C |
| P.V.C. polymer* | 100 | 100 | 100 |
| Di-2-ethylhexyl phthalate | 20 | | |
| Tetra-allyl ester of all cis CPTCA | 40 | 60 | 40 |
| Di-allyl phthalate | | | 20 |
| Di-tert. butyl peroxide | 0.2 | 0.3 | 0.3 |
| Di-butyl tin dilaurate | 2 | 2 | 2 |

*The P.V.C. polymer employed was that commercially available in the United Kingdom under the trade name "GEON 121." The word 'GEON" is registered as a trademark in the United Kingdom.

The compositions, which were obtained in the form of plastisols, were pressed into flat sheets which were found to have low permeability to highly aromatic gasoline fuel.

As previously mentioned, the esters of Formula I are useful as cross-linking agents in unsaturated resin dough moulding compositions. Thus in accordance with a further aspect of the invention, there is provided a method of cross-linking an unsaturated polyester resin with an unsaturated monomer such as styrene, wherein there is used as a cross-linking agent in addition to the styrene an unsaturated ester of Formula I, preferably a tetra- or di-ester, for example the tetra-allyl or di-allyl ester of all cis CPTCA. It has in fact surprisingly been found that replacement of part of the styrene used as a cross-linking agent for an unsaturated polyester resin by an unsaturated ester of the invention yields products of higher cross-linked density.

The following example illustrates the use of the esters of the invention in accordance with this aspect of the invention.

Example B

An unsaturated polyester resin was prepared in a known manner from phthalic anhydride, maleic anhydride and propylene glycol in a molar ratio of 1:1:2 respectively. The resin so formed was then blended with various amounts of styrene and a cross-linking agent of the invention as indicated below.

| Constituent | Parts by weight | | | | | |
|---|---|---|---|---|---|---|
| | A | B | C | D | E | F |
| Polyester resin | 100 | 100 | 100 | 100 | 100 | 100 |
| Styrene | 30 | 15 | | 30 | 15 | |
| Diallyl ester of all cis CPTCA | 10 | 25 | 40 | | | |
| Tetra-allyl ester of all cis CPTCA | | | | 10 | 25 | 40 |

Each of the resin blends was then formed into a dough moulding composition by mixing with filler, glass fibre reinforcement and catalyst as indicated below.

Constituent: Parts by weight
  Resin blend _____ 140
  Benzoyl peroxide _____ 1.87
  Zinc stearate _____ 0.94
  Precipitated calcium carbonate _____ 302
  Chopped glass fibre (½ inch) _____ 147

In the case of resin blends C and F where the styrene was completely replaced by the allyl esters, it was found necessary to add acetone to the blend to give sufficient mobility to allow efficient mixing to be effected. The acetone was subsequently removed under vacuum.

The dough moulding compositions were then moulded at a temperature of 150° C. and a pressure of 500 pounds per square inch, although in fact the moulding may be effected at a temperature in the range of from 120–170° C. and at a pressure in the range of from 100 to 500 p.s.i.

The moulded compositions containing the diallyl ester and especially the tetra-allyl ester were surprisingly found to be markedly superior to conventional compositions in electrical breakdown strength after tropical ageing and are therefore useful in the manufacture of, for example electrical switches, switchgear shrouds and fuse boxes designed to be used in a humid environment. It has in fact surprisingly been found that dough moulding compositions containing the tetra-allyl ester exhibit an increased electrical breakdown strength after tropical ageing, whereas conventional compositions exhibit a decreased strength after tropical ageing.

As mentioned above, the esters of Formula I are useful as bonding agents for assisting the adhesion of polyvinyl chloride to metal surfaces. Thus in accordance with a still further aspect of the invention, there is provided a method of coating a metal surface with polyvinyl chloride wherein an unsaturated ester of Formula I, preferably a tetra-ester, is used as a bonding agent for the resin.

For improving the adhesion of P.V.C. to steel, it has been found that the tetra-allyl ester of all cis CPTCA is the preferred ester. Since the tetra-allyl ester of all cis CPTCA has been found not to be so readily leached out of a sheet of P.V.C. by aromatic petroleum fuels as compared with conventional cross-linking and bonding agents, the use of the tetra-allyl ester as a bonding agent for P.V.C. is advantageous in the manufacture of a P.V.C. lined metal tank designed as a container for aromatic fuels.

The following example illustrates the use of the esters of the invention in accordance with this aspect of the invention.

Example C

Three P.V.C. plastisols were prepared as indicated below:

| Constituent | Parts by weight | | |
| --- | --- | --- | --- |
| | A | B | C |
| P.V.C. polymer ("GEON 121") | 100 | 100 | 100 |
| Di-2-ethyl hexyl phthalate | 50 | 40 | 30 |
| Tetra-allyl ester of all cis CPTCA | 10 | 20 | 40 |
| Di-tert. butyl peroxide (catalyst) | 0.3 | 0.3 | 0.3 |
| Dibutyl tin dilaurate (stabilizer) | 2 | 2 | 2 |

Each plastisol obtained by mixing the foregoing constituents was spread on to degreased, shot blasted mild steel plate and then gelled in an oven. Determination of the tensile adhesion normal of the surface of the coated steel plate showed that the presence of the allyl ester improved adhesion of the P.V.C. coating to the steel by over 3½ times compared with a standard formulation in which part of the phthalate is not replaced by the allyl ester.

What is claimed is:
1. Derivatives of all cis 1,2,3,4-cyclopentanetetracarboxylic acid represented by the general formula:

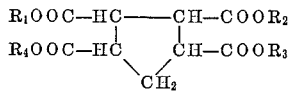

wherein two of $R_1$, $R_2$, $R_3$ and $R_4$ are allyl groups and the remaining two are hydrogen or allyl groups.

2. Tetra-allyl ester of all cis 1,2,3,4-cyclopentanetetracarboxylic acid.

3. Di-allyl ester of all cis 1,2,3,4-cyclopentanetetracarboxylic acid.

4. A method of cross-linking an unsaturated polyester resin with the unsaturated monomer styrene, wherein there is employed as a cross-linking agent in addition to the unsaturated monomer an ester of all cis 1,2,3,4-cyclopentanetetracarboxylic acid represented by the general formula:

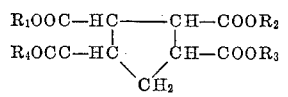

wherein $R_1$, $R_2$, $R_3$ and $R_4$ represent hydrogen, a saturated aliphatic group, an unsaturated aliphatic group having at least 3 carbon atoms, an alicyclic group, an aralkyl group or a heterocyclic substituted alkyl group, each of said aliphatic, alicyclic, aralkyl and heterocyclic substituted alkyl groups having up to a maximum of 12 carbon atoms, the values of $R_1$, $R_2$, $R_3$ and $R_4$ being chosen so that at least one of them is an unsaturated aliphatic group having at least 3 carbon atoms.

5. Method according to claim 4, wherein a tetra- or diester is employed as the cross-linking agent.

6. Method according to claim 4, wherein the cross-linking agent is the di-allyl ester of all cis 1,2,3,4-cyclopentanetetracarboxylic acid.

7. Method according to claim 4, wherein the cross-linking agent is the tetra-allyl ester of all cis 1,2,3,4-cyclopentanetetracarboxylic acid.

8. Method according to claim 4, wherein the unsaturated polyester resin is formed from phthalic anhydride, maleic anhydride and propylene glycol.

References Cited

UNITED STATES PATENTS 3,074,997 1/1963 Lynn et al. _____ 260—468
3,157,713 11/1964 Leese _____ 260—884
3,211,691 10/1965 Petropoulos et al. ____ 260—468

MORRIS LIEBMAN, Primary Examiner.

R. BARON, Assistant Examiner.